US010193888B1

(12) United States Patent
Belton, Jr. et al.

(10) Patent No.: US 10,193,888 B1
(45) Date of Patent: *Jan. 29, 2019

(54) DYNAMIC AUTHENTICATION IN ALTERNATE OPERATING ENVIRONMENT

(71) Applicant: Wells Fargo Bank, N.A., San Francisco, CA (US)

(72) Inventors: Lawrence T. Belton, Jr., Charlotte, NC (US); Ryan Bernard Benskin, Charlotte, NC (US); Jon Gabel, Charlotte, NC (US); Michael Grove, Des Moines, IA (US); Timothy H. Morris, Lexington, NC (US); Jonathan D. Russell, Charlotte, NC (US); Robert Glenn Yelton, Jr., Mount Pleasant, SC (US); Douglas S. Rodgers, Mooresville, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,966

(22) Filed: Jul. 10, 2017

Related U.S. Application Data

(63) Continuation of application No. 14/494,003, filed on Sep. 23, 2014, now Pat. No. 9,742,770, which is a
(Continued)

(51) Int. Cl.
*H04L 29/08* (2006.01)
*H04L 29/06* (2006.01)
*G06F 21/45* (2013.01)

(52) U.S. Cl.
CPC .............. *H04L 63/10* (2013.01); *G06F 21/45* (2013.01); *H04L 63/08* (2013.01); *H04L 63/083* (2013.01);
(Continued)

(58) Field of Classification Search
CPC ...... H04L 67/306; H04L 63/102; G06Q 10/06
(Continued)

(56) References Cited

U.S. PATENT DOCUMENTS

| 6,810,480 B1 * | 10/2004 | Parker ..................... G06F 21/32 713/168 |
| 7,370,350 B1 | 5/2008 | Salowey |

(Continued)

OTHER PUBLICATIONS

David Newman. "10 Gig access switches: Not just packet pushers anymore", Network World, Mar. 24, 2008, 5 pages, vol. 25, No. 12. Retrieved from: https://www.networkworld.com/article/2284235/lan-wan/10-gig-access-switches-not-just-packet-pushers-anymore.html.

*Primary Examiner* — Haresh N Patel
(74) *Attorney, Agent, or Firm* — Walter Haverfield LLP; James J. Pingor

(57) ABSTRACT

Systems and methods that employ dynamic credentials across distinct authentication standards can be used to reduce the burden associated with repeated re-authentication. A utility can be employed during logon in an alternate operating environment that stores information from the logon dynamically and generates a credential file that is employed to grant access to a resource without repeating the earlier logon procedure, even if the device changes its user state. After processes requiring resource access are complete, or when an allowed time expires, the granted access is revoked and the device returns to a default or standard authentication technique.

16 Claims, 9 Drawing Sheets

Related U.S. Application Data continuation of application No. 13/491,163, filed on Jun. 7, 2012, now Pat. No. 8,875,252.

(52) U.S. Cl.
CPC ........ *H04L 63/101* (2013.01); *H04L 63/0876* (2013.01)

(58) Field of Classification Search
USPC .............................................. 726/4
See application file for complete search history.

(56) References Cited

U.S. PATENT DOCUMENTS

| | | | | |
|---|---|---|---|---|
| 7,469,291 | B2* | 12/2008 | Hammell | G06F 21/41 709/225 |
| 7,640,574 | B1* | 12/2009 | Kim | G06F 21/31 726/1 |
| 7,702,787 | B1* | 4/2010 | Raghunathan | G06F 21/41 709/225 |
| 7,810,138 | B2 | 10/2010 | Vank et al. | |
| 7,921,209 | B2* | 4/2011 | Hammell | H04L 63/0815 709/225 |
| 8,037,290 | B1 | 10/2011 | Stutton | |
| 8,122,485 | B2 | 2/2012 | Dholakia et al. | |
| 8,127,123 | B2 | 2/2012 | Raley et al. | |
| 8,151,358 | B1* | 4/2012 | Herold | G06Q 10/107 726/27 |
| 8,443,431 | B2* | 5/2013 | Mizikovsky | H04L 63/0892 380/247 |
| 8,533,329 | B2* | 9/2013 | Hammell | H04L 63/0815 709/225 |
| 8,533,789 | B1* | 9/2013 | Raghunathan | G06F 21/45 709/225 |
| 8,533,797 | B2* | 9/2013 | Shah | G06F 21/335 726/28 |
| 2006/0064493 | A1* | 3/2006 | Hammell | G06F 21/41 709/227 |
| 2006/0248082 | A1 | 11/2006 | Raikar et al. | |
| 2007/0079136 | A1* | 4/2007 | Vishik | G06Q 20/0855 713/186 |
| 2009/0077644 | A1* | 3/2009 | Hammell | G06F 21/41 726/7 |
| 2009/0088133 | A1* | 4/2009 | Orlassino | H04L 63/08 455/411 |
| 2009/0265776 | A1* | 10/2009 | Baentsch | H04L 63/08 726/9 |
| 2009/0304582 | A1* | 12/2009 | Rousso | A61B 5/02755 424/1.61 |
| 2010/0021378 | A1* | 1/2010 | Rousso | A61B 5/411 424/1.11 |
| 2010/0077447 | A1* | 3/2010 | Dholakia | H04L 63/08 726/3 |
| 2010/0100953 | A1* | 4/2010 | Mowers | H04L 63/0807 726/10 |
| 2010/0162372 | A1* | 6/2010 | Raghunathan | G06F 21/41 726/5 |
| 2010/0169952 | A1* | 7/2010 | Maki | H04L 63/0846 726/3 |
| 2010/0223348 | A1* | 9/2010 | Przybysz | H04L 65/1069 709/206 |
| 2010/0293570 | A1* | 11/2010 | Teraoka | H04L 63/0428 725/31 |
| 2010/0299717 | A1* | 11/2010 | Nasirifard | G06Q 10/06 726/1 |
| 2011/0030044 | A1* | 2/2011 | Kranendonk | H04L 63/0815 726/8 |
| 2011/0107085 | A1* | 5/2011 | Mizikovsky | H04L 63/0892 713/155 |
| 2011/0107399 | A1 | 5/2011 | Dholakia et al. | |
| 2011/0162062 | A1* | 6/2011 | Kumar | G06F 21/10 726/15 |
| 2011/0167484 | A1* | 7/2011 | Hammell | G06F 21/41 726/6 |
| 2011/0202981 | A1 | 8/2011 | Tamai et al. | |
| 2011/0225625 | A1* | 9/2011 | Wolfson | H04L 63/08 726/1 |
| 2011/0283097 | A1 | 11/2011 | Weber et al. | |
| 2011/0283344 | A1 | 11/2011 | Krishnan et al. | |
| 2011/0302637 | A1 | 12/2011 | Hamada et al. | |
| 2011/0321117 | A1* | 12/2011 | Nestler | G06F 21/604 726/1 |
| 2012/0042359 | A1 | 2/2012 | Kuroda | |
| 2012/0110329 | A1* | 5/2012 | Brown | G06F 21/31 713/168 |
| 2012/0117622 | A1* | 5/2012 | Gronholm | H04L 63/10 726/3 |
| 2012/0184242 | A1* | 7/2012 | Li | H04L 63/0815 455/406 |
| 2012/0216239 | A1* | 8/2012 | Yadav | H04L 63/0227 726/1 |
| 2012/0278855 | A1* | 11/2012 | Ando | H04L 63/08 726/3 |
| 2012/0297447 | A1 | 11/2012 | Dholakia et al. | |
| 2013/0007194 | A1* | 1/2013 | Doleh | H04L 67/2814 709/217 |
| 2013/0111586 | A1* | 5/2013 | Jackson | G06F 11/3438 726/23 |
| 2013/0133023 | A1* | 5/2013 | Burstein | G06F 21/00 726/1 |
| 2013/0167211 | A1* | 6/2013 | Kamat | H04L 63/08 726/7 |
| 2013/0203384 | A1* | 8/2013 | Narasimhan | H04L 63/0227 455/411 |
| 2013/0232541 | A1* | 9/2013 | Kapadia | G06F 21/33 726/1 |
| 2013/0254840 | A1* | 9/2013 | Islam | H04L 63/0815 726/3 |
| 2013/0333002 | A1 | 12/2013 | Belton et al. | |

* cited by examiner

US 10,193,888 B1

DYNAMIC AUTHENTICATION IN ALTERNATE OPERATING ENVIRONMENT

This application is a Continuation of co-pending U.S. patent application Ser. No. 14/494,003 filed on Sep. 23, 2014 which is a continuation of application Ser. No. 13/491,163, now U.S. Pat. No. 8,875,252, filed Jun. 7, 2012, and each entitled "DYNAMIC AUTHENTICATION IN ALTERNATE OPERATING ENVIRONMENT." The entirety of the above-noted applications are incorporated by reference herein

BACKGROUND

This disclosure relates generally to data processing systems and, more particularly, to dynamically authenticating endpoints in remote access architectures.

In modern enterprises reliant on interconnectivity, security and access controls are indispensable tools that prevent unauthorized intrusions to private networks. With few exceptions, most networks capable of accessing even the least sensitive organizational assets require some form of authentication via an uncontrolled communication channel. Once a user or device is authenticated, they may be granted permission to one or more controlled channels providing the user increased access.

However, access controls, by design, create friction within a computing environment. It is not unusual for several steps of authentication and re-authentication to occur during normal operation. While these inconveniences can benefit both enterprise and end user by providing security, such inefficiencies can pose a very impractical burden on certain classes of users. Those involved in implementing changes on devices over networks feel these encumbrances keenly, as these tasks may require several re-authentications to allow system modifications, change login statuses, enable or restrict other communication techniques, or reboot devices.

Unfortunately for developers and administrators, it is difficult to automate authentication tasks without severely compromising security. Thus, a great deal of time and resources are wasted when propagating changes across an enterprise. Given at least these concerns, it can be readily appreciated that streamlining the authentication process in some environments could yield substantial benefits provided that the necessary restructuring does not concede security.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with utilizing a plurality of standards for network access control in conjunction with the utilization of remote resources.

In one aspect, at least two methods of authenticating a device to access remote resources are employed to automate repeat authentications.

In one aspect, credentials used to authenticate by at least one of the methods of authenticating a device can be saved dynamically, obviating the need for static credentials or decreased security.

In one aspect, at least one of the methods of authenticating a device includes adding an entry to a table (e.g., 230A of FIG. 2) of excepted devices, the entry based at least in part on a network identifier.

In other aspects, additional components can be employed to provide network functionality, manage credentials, manage access to remote resources, and perform other tasks as required herein, where such capabilities are non-native to the device's operating environment.

In one aspect, the entry to the table of excepted devices can be deleted or disallowed after the satisfaction of one or more conditions. Additional stored credentials or access information can likewise be eliminated or hidden upon the satisfaction of conditions that can be the same or different from the former conditions.

In yet another aspect a means is provided that facilitates the aforementioned techniques.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
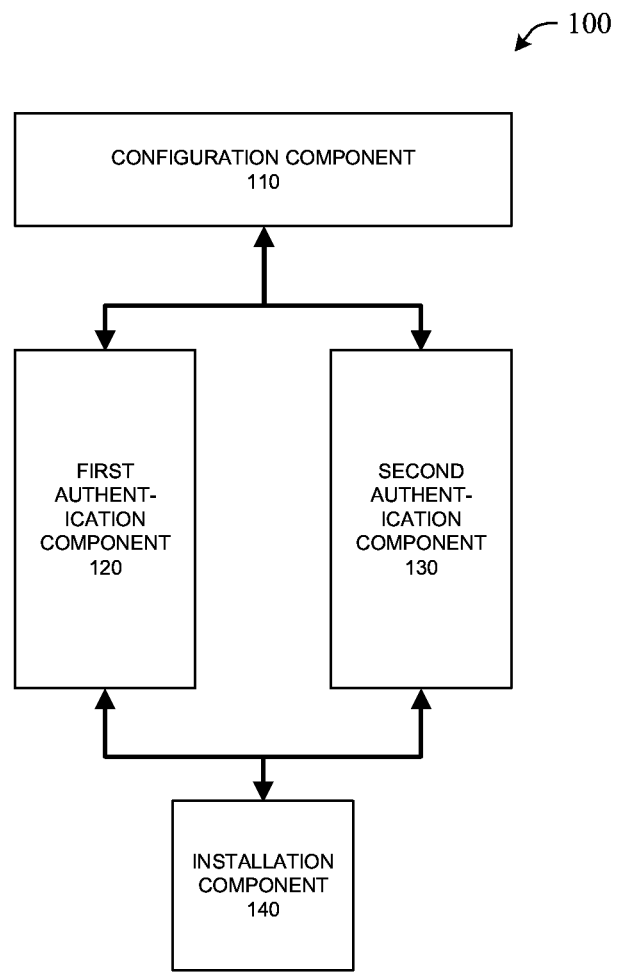
FIG. 1 illustrates a block diagram of a configuration system employing two distinct authentication components.

Systems and methods that employ dynamic credentials across distinct authentication standards can be used to reduce the human burden associated with repeated re-authentication. A utility can be employed at an initial logon in an alternate (or alternative) operating environment (e.g., a mode other than the mode typically used by the end user) that stores information from the initial logon dynamically and generates a credential file that is employed to grant access to a resource without repeating the initial logon, utilizing at least two separate authentication procedures. The device accessing resources can change its state (e.g., reboot, switch users, disconnect/reconnect, change permissions, et cetera) and return to resource access without requiring repetition of the initial logon procedure. After processes requiring resource access are complete, or when an allowed time expires, the granted access is revoked and the device returns to the earlier logon.

For purposes of simplicity, the term "authentication" and similar terms may be used herein to describe any procedures for granting or restricting permissions to connections between devices or remote resources. While some techniques (e.g., bypass tables) may not be authentication per se, such techniques still at least evaluate information and/or characteristics to determine whether a particular permission should be granted under the circumstances. Those of skill in the art will appreciate the generalized use of this term and others for purposes of conveying the scope and flexibility of aspects of the subject innovation.

As used herein, some examples employing the terms "state" or "user state" can be used to convey the logging on and off of users to a device or remote connection, as well as a set of conditions that, if changed, require a user or an administrator to provide confirming including authentication or re-authentication.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable or script, a thread of execution, a program, a computer, and/or information relevant to effecting the desired function. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

Various aspects will be presented in terms of systems that may include a number of components, modules, and the like. It is to be understood and appreciated that the various systems may include additional components, modules, et cetera and/or may not include all of the components, modules, et cetera discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, illustrated is a system 100 for configuring a device employing two distinct authentication components. System 100 includes configuration component 110, first authentication component 120, second authentication component 130, and installation component 140. These components can be in communication or operatively coupled by any means suitable for the interaction of electronic components. Further, additional devices such as modems, routers, access points, hubs, repeaters, servers, crossover hardware or cabling, and others can intervene between components. Finally, the components of system 100 can interact by any appropriate means, to include communication across one or more networks (virtual or literal), within one or more domains, in a wired or wireless fashion, over secure or open protocols; and/or by direct or remote connections such as USB, serial, parallel port, FireWire, infrared, Bluetooth™, and others.

First authentication component 120 and second authentication component 130 can authenticate devices or entities before such are permitted access to configuration component 110 or other resources. First authentication component 120 and second authentication component 130 can employ one or more of (but are not limited to) Extensible Authentication Protocol (EAP) and developments thereof (e.g., PEAP), Microsoft Challenge-Handshake Authentication Protocol (MS-CHAP [v1 and v2]), device- or network identifier-based authentication (e.g., media access control [MAC] address, internet protocol address, serial number, et cetera), Kerberos, Authentication, Authorization and Accounting (AAA) management such as Remote Authentication Dial In User Services (RADIUS), Java Authentication and Authorization Service (JAAS), non-encrypted or encrypted keys or tokens, key sharing, external device authentication (e.g., USB-key based unlock), local passwords, network keys, biometrics, time-based approaches, and other single- or multi-factor identification or authentication techniques and technologies used in conjunction therewith.

In one or more embodiments, first authentication component 120 can employ a logon requiring presentation of credentials. For example, a user can be prompted to input a username and password permitting the user to log into their domain. Second authentication component 130 can authenticate in a way that does not require additional production of credentials, such as by using a table of stored information relating to a user and/or device. While first authentication component 120 is described in a fashion requiring user action to facilitate authentication, it is to be appreciated that alternative embodiments can require no user interaction to perform an authentication. It is to be appreciated that, in some embodiments, first authentication component 120 and second authentication component 130 provide different authentication mechanisms for the same network or networks. In one or more embodiments, first authentication component 120 can be the default or primary authentication component, or otherwise automatically present for authentication when a device starts or a user attempts to log onto the device or join a network.

In an example, system 100 can include a device seeking access to configuration component 110 via a network. The network can be configured to employ a plurality of authentication techniques, including an EAP-type authentication over 802.1x, effected by first authentication component 120, and a MAC address bypass (MAB)-type authentication, effected by second authentication component 130. Endpoint 140 can be a supplicant on an 802.1x network, with an authenticator and authentication server realized by or in conjunction with first authentication component 120 or other components of system 100.

To access configuration component 110, the device can call installation component 140, which is configured to facilitate access to configuration component 110 and installation of the configuration(s) associated with configuration component 110. On a first attempt at network access, the device would prompt for authentication credentials appropriate for use with first authentication component 120. If authentication is failed, the prompt can repeat, the installation component can be called again, and/or the device can be disallowed from attempting to re-authenticate, for a period of time or until an administrator unlocks the device or port on which the device is interacting. Upon successful application of credentials, installation component 140 can store the successful credentials. In at least one embodiment, the successful credentials are stored as environmental variables.

The MAC address of the device can be discovered, and passed with the stored successful credentials to second authentication component 130. Second authentication component 130 can then create an entry in a MAB table to permit additional or re-authentication. Once the device is authenticated via second authentication component 130, authentication via first authentication component 120 can (but need not necessarily in all embodiments) be discontinued.

Once authentication via second authentication component 130 is accomplished, installation component 140 can access configuration component 110 via a network that is accessed at least in part by second authentication component 130. This access can be renewed or restored should the device require such while making changes in connection with configuration component 110. For example, some aspects of configuration can require the device to reboot. Rather than requiring the device to hold until logon via first authentication component 120 is accomplished, second authentication component 130 can bypass first authentication component 120 and permit access to configuration component 110 without requiring input of credentials.

In one or more embodiments, second authentication component 130 can include a feature to disallow authentication via second authentication component 130. Permission to utilize the "touchless" authentication accomplished by second authentication component 130 can expire, for example, after a period of time, after the completion of an activity, and/or upon multiple or other conditions. In the example above, the entry in the MAB table can automatically be erased after 24 hours, or upon completion of the device configuration in accordance with configuration component 110, depending on which occurs first. Likewise, installation component 140 can be made inaccessible or deleted upon completion of configuration in accordance with configuration component 110.

In one or more embodiments, at least as a result of these procedures, the device defaults to the first authentication component 120 for authentication subsequent to expiration of permission to utilize the second authentication component 130. In an embodiment, the device now operates in a standard (as opposed to alternate) environment. In at least one embodiment, second authentication component 130 is still available to the device, although not via installation component 140, and first authentication component 120. In at least one alternative embodiment, second authentication component 130 is no longer available to the device, without administrator interaction or at all. In an embodiment according to the example presented, following completion of device configuration in accordance with configuration component 110, the MAB table entry is deleted and the device is no longer permitted to call installation component 140. The device reboots into a standard environment, and an 802.1x network challenges the device for credentials by leveraging PEAP MS-CHAPv2 authentication, which the device uses thereafter.

In at least one embodiment in accordance with this example, a MAB table entry can be recreated to enable use of second authentication component 130, but the device can no longer automate this process without access to installation component 140. In this way, the device is not physically disallowed from attempting authentication through second authentication component 130, but cannot practically authenticate in this fashion in a standard environment.

Figure 2:
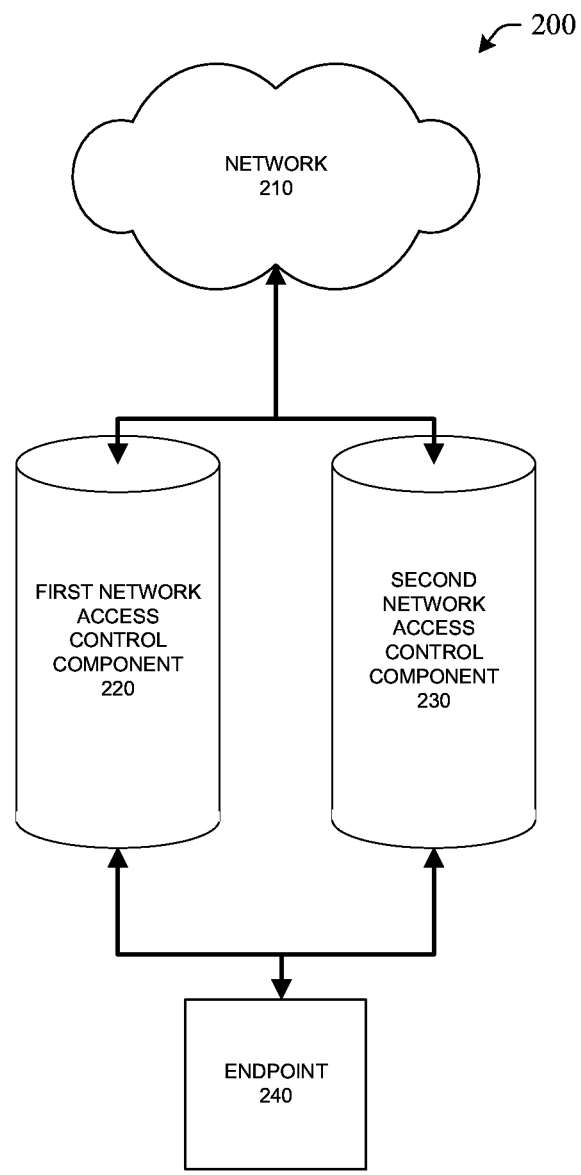
FIG. 2 illustrates a diagram of an endpoint utilizing two distinct network access controls to retrieve network resources.

With respect to FIG. 2, illustrated is a diagram of an endpoint utilizing two distinct network access controls to retrieve network resources. In this figure, endpoint 240 seeks to access network 210. First network access control component 220 and second network access control component 230 control access when endpoint 240 seeks to access network 210. Access can be defined by first network control component 220 and second access control component 230 (or other access controls or components) in, by way of analogy, a gradient. Access can be a binary decision of allowance or denial, but, in some embodiments, can be defined for a device or group of devices in degrees. Various limitations on access and permissions are understood by the skilled artisan, and excluded here in the name of brevity.

When endpoint 240 attempts to connect to the network, first network access control component 220 can challenge endpoint 240 for logon information. After first network access control component logs endpoint 240 onto network 210, endpoint 240 can be granted authority to request logon to network 210 via second network access control component 230. Thereafter, when endpoint 240 requests to be logged onto network 210, endpoint 240 will not be challenged in accordance with first network access control component 220, but proceed to logon utilizing second network access control component 230. Second network access control component 230 can include any nature of logon technique, but, in some embodiments, can include "one touch" and/or "zero-touch" logon techniques using endpoint recognition and/or dynamically-stored logon information.

When endpoint 240 has been granted permission to request logon via second network access control component 230, this logon can be effected automatically employing the aforementioned "zero-touch" technique. At most, credentials must be provided for an initial logon via first network access control component 220. After this initial logon is successful and the recognized logon information associated with endpoint 240 is known, second network access control component 230 can be used to obviate the need for further endpoint action supporting repeated logons thereafter. This permission can sustain for a period of time, until access to network 210 is no longer necessary (e.g., upon completion of tasks related to network 210), or in accordance with other rules or conditions. In one or more embodiments, permission to logon via second network access control component 230 can sustain indefinitely. However, in other embodiments (in accordance with the focus of most examples herein), the permission to employ second network access control component does not last beyond a finite time or condition.

Figure 3:
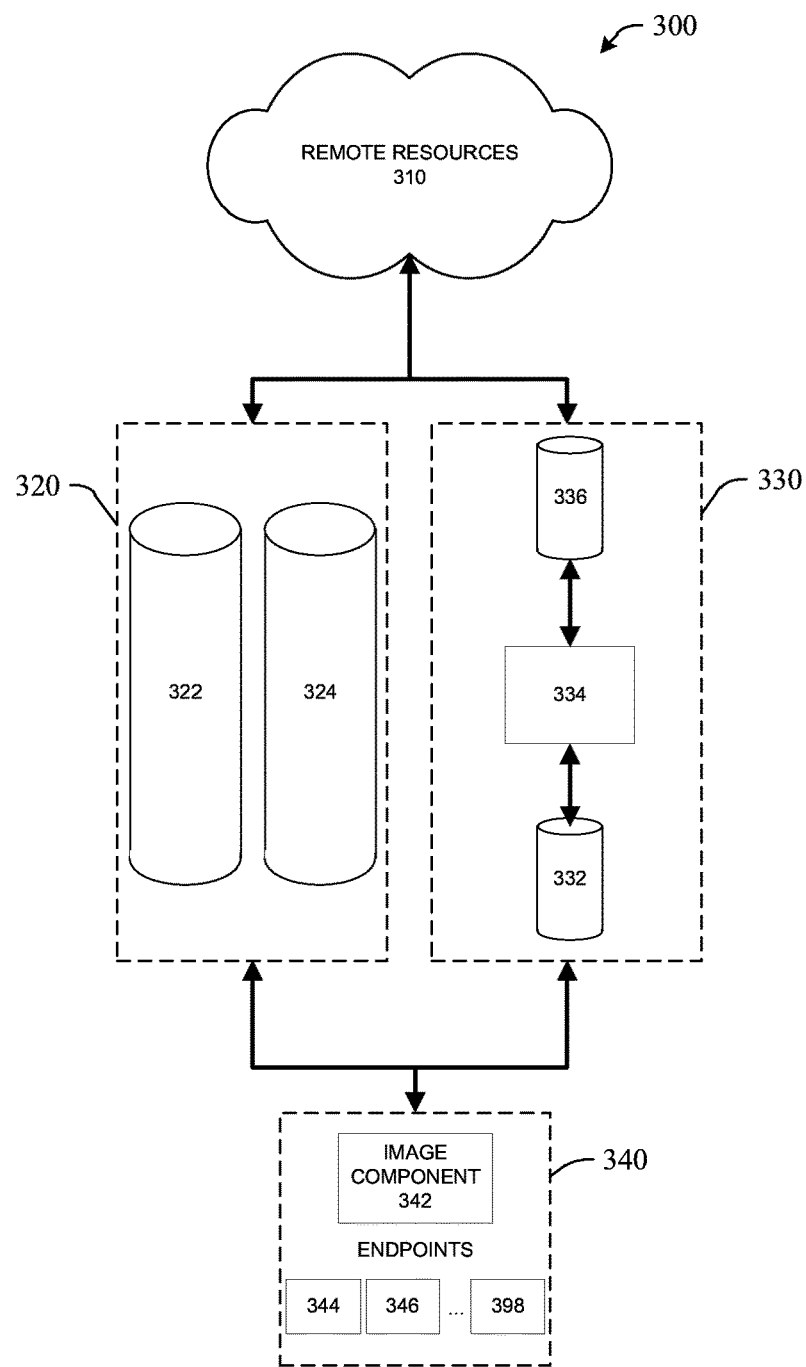
FIG. 3 illustrates a diagram of endpoints utilizing two distinct access controls to retrieve remote resources.

With reference to FIG. 3, illustrated is a diagram of endpoints 340 utilizing two distinct access controls 320 and 330 to retrieve remote resources 310. Endpoints 340 join a remote connection with first access control 320 and second access control 330. First access control 320 and second access control 330 can be used to grant endpoints 340 access to remote resources 310.

Endpoints 340 can include a plurality of individually identifiable endpoints, such as endpoint 344, endpoint 346, and others, including endpoint 398. Endpoints 344 can be devices or entities, comprised of identical, similar, partially similar, or wholly different components. In one example, endpoints 340 can include desktop computers, notebook computers, tablets, phones and other mobile devices, et cetera. In this example, some (but not necessarily all) of the desktop computers and phones can be the same manufacturer and model, and otherwise functionally identical, while the notebook computers can all be different models but running the same operating system, and a group of tablets can be running a different operating system. In an alternative example, endpoints 340 are only a group of functionally identical desktops.

In one or more embodiments, first access control 320 includes uncontrolled port 322 and controlled port 324. When attempting to access network resources 310 by gaining access via first access control 320, endpoints 340 call image component 342. Image component 342 can be resident upon or within endpoints 340 (e.g., as part of a pre-installation or recovery package, existing on a distinct partition or in firmware, installed as software, et cetera), introduced using external media (e.g., run from a flash drive, external hard disk, DVD, et cetera), or accessed via a remote connection (e.g., via a physical or virtual local area network, as part of first access control 320 or second access control 330, or through other means of remotely transmitting information over secured or limited-access connections). Image component 342 performs initial and ongoing action to facilitate the access of remote resources 310 by endpoints 340 utilizing first access control 320 and second access control 330 according to the details described herein. In some embodiments, image component 432 can provide functionality for establishing connections in environments where protocols or other requirements to communicate in accordance with first access control 320 and/or second access control 330 are not supported.

After running image component 342, endpoints 340 can seek access to remote resources 310. Upon establishing a remote connection, endpoints 340 first connect via uncontrolled port 322. Uncontrolled port 322 can restrict the type of transmissions permitted, acting as an access control port for providing challenges to endpoints 340 and receiving access request information in return. Once an acceptable access request is transmitted via uncontrolled port 322, endpoints 340 can be permitted to transmit via controlled port 324, which includes increased clearance to access, for example, remote resources 310. In an embodiment, transmission via controlled port 324 can include access to a drive or file image. In at least one embodiment, connections through controlled port 324 can access other internal or external entities, logical or physical.

It is appreciated that, while first access control 320 is described above in terms of uncontrolled port 322 and controlled port 324, other embodiments can be accomplished utilizing analogous distinct channels, networks (virtual or physical), lines, connections, or other means of communication. In at least one embodiment, first access control 320 can have a single port utilizing an alternative control measure.

Once endpoints 340 are granted access via access control 320 over controlled port 324, recognized access information can be stored as environmental variables. Thereafter, an access record can be passed to permit endpoints 340 to gain access to remote resources 310 via second access control 330. Second access control 330 can include preliminary connection 332, access record list 334, and final connection 336.

In some embodiments, access record list 334 can include, but is not limited to, a group of access records comprising combinations of information from endpoints 340. For example, access record list 334 can include a list of endpoint identifiers associated with respective names and passwords from instances of individual endpoints among endpoints 340 connecting via first access control 320. In one or more embodiments, a single endpoint identifier can be associated with multiple entries in access record list 334, indicating a plurality of names and passwords utilizing that device or port. In one or more alternative embodiments, each endpoint identifier is limited to a single record in access record list 334, and duplicate records for a particular endpoint identifier can overwrite the existing record, be discarded, and/or be logged or stored elsewhere.

Access record list 334 can include timestamps or other annotations associated with one or more access records. An access records can be restricted, disallowed, or deleted based on at least a timestamp or other annotation associated with the access record. Rules for altering access records can be multi-part, complex, and dynamic. In one or more embodiments, an access record can be removed from access record list 334 after the earlier of 24 hours or when an operation involving remote resources 310 is complete. In one or more embodiments, the timestamp or other annotations associated with an access record are updated based on activity at endpoints 340, or following the granting of access via one or both of first access control 320 and second access control 330. In one or more embodiments, an individual endpoint among endpoints 340 can be treated differently or have different rules or conditions applied relating to the persistence or lifespan of, or updates to, an associated access record in access record list 334.

The endpoint identifier in an access record of access record list 334 can include, but is not limited to, a MAC address, internet protocol (IP) address, serial number, port address, name, or other aspect used to distinguish endpoints in remote connections. The information associated with an endpoint identifier can include, but is not limited to, a name, username, nickname, or other user identifier, and password, key, certificate, code, or other access control linked to a user, and/or multiples and combinations thereof. These examples are merely intended to capture the spirit of one or more aspects of an access record of access record list 334, rather than an exhaustive list, and those skilled in the art will appreciate other data or arrangements thereof capable of accomplishing similar ends in the present setting.

When endpoints 340 request access to remote resources 310 via second access control 330, a comparison is made using access record list 334. Endpoints 340 transmit to initial connection 332, and access record list 334 is read to determine whether access records from endpoints 340 exist in access record list 334. If no matching access record is discovered in access record list 334, endpoints 340 can, in some embodiments, be restricted to traffic via first access control 320 or dropped from the connection. In one or more embodiments, image component 342 can be called again if no matching access record is found in access record list 334, and, by requesting access via first access control 320, endpoints 340 and/or image component 342 can attempt to create a matching access record in access record list 334 for access via second access control 330.

Upon interrogation by access control 330, if a matching access record is found in access record list 334, endpoints 340 are granted access to remote resources 310 via final connection 336. If access must be re-requested for any reason, endpoints 340 are checked against access record list 334 first for subsequent granting of access without necessitating the use of first access control 320 and avoiding other steps related to acquiring access to remote resources 310.

This re-request permission for endpoints 340 will persist so long as the associated access records remain in access record list 334. In at least one embodiment, endpoints 340 can shut down, reboot, log off, log on, change users, apply changes to configuration or settings, install information, un-install information, and otherwise perform activities that require re-authentication when connecting to remote resources.

If a period of time for which a particular access record persists in access record list 334 expires, the particular access record will be removed from access record list 334. In at least one embodiment, endpoints 340 will be permitted to "start over" with respect to access if they require access to remote resources 310. In one or more further embodiments, image component 342 can "wipe" any changes committed during the time since it was first called, returning endpoints 340 to their original state prior to connecting for access to remote resources 310. In one or more alternative embodiments, image component 342 can "freeze" changes committed and track remaining changes to accomplish, allowing endpoints 340 to resume access to remote resources 310 after a new access record can be created in access record list 334. In additional alternative embodiments, access to remote resources 310 can be completed without access control 330, instead allowing endpoints 340 to reacquire access via access control 320 each time such access is required. In at least one embodiment, endpoints 340 do not "start over" with respect to access, and are, temporarily or permanently, barred from employing access control 330 for additional access to remote resources 310. It is to be appreciated that other schemes for restarting, resuming or terminating access to remote resources 310, via one or both of first access control 320 and second access control 330, will be appreciated by those skilled in the art, and the small number of possible embodiments set forth above is intended only to convey the spirit of these aspects rather than an exhaustive listing.

Once endpoints 340 have completed the use of remote resources 310, access via access control 330 can be discontinued. This determination can be made by one or more of endpoints 340, image component 342, access control 330, access record list 334, remote resources 310, or other components of system 300 (including aspects described herein but not pictured), alone or in combination with one another. In at least one embodiment, a disk image among remote resources 310 is applied to endpoints 340, and, following the final configuration steps and reboots, it is determined that imaging is complete. This can trigger a determination that use of network resources 310 is complete. In one or more embodiments, a post-use check can occur that confirms endpoints 340 have successfully completed their use of remote resources 310 and that the results of such use are as desired. For example, the installed programs can be checked against those of the image to ensure they are present, and each program can be launched and closed automatically to ensure its proper function. Other, more complex examples and embodiments of checks relating to data integrity, compatibility, system function, et cetera, will be appreciated by those skilled in the art, but are omitted here for brevity.

Whether by expiration in access record list 334 or completion of use of remote resources 310, image component 342 can disallow or remove itself from endpoints 340 upon given conditions in some embodiments. In one example, an imaging process is complete, and image component 342 removes itself from endpoints 340 (or any external media on which image component 342 resides). In embodiments where endpoints 340 access image component 342 remotely, such access can be disallowed. Similar effects can be accomplished upon expiration of an applicable access record in access record list 334. In some embodiments, no such deletion or disallowance occurs on any condition, and image component 342 remains accessible, locally (externally or internally) or remotely, even after remote resources 310 are no longer in use for imaging (or related) purposes and a pertinent access record has been removed from access record list 334.

When use of image component 342 ceases following completion of use of network resources 310, endpoints 340 operate in a standard end user environment, and employ a default access control (which can be access control 320, access control 330, or an access control not pictured) to access remote material (which can, but need not, include remote resources 310). In at least one embodiment, endpoints 340 connect through access control 320, and no longer connect via access control 330.

In one or more embodiments, endpoints 340 can be a new device (e.g., desktop computer, notebook computer, tablet, telephone, personal digital assistant, media device, mobile device, et cetera) to a network or a device operating in a pre-installation or alternate environment (e.g., using Windows PE, Mac OS X Netboot, diagnostic or configuration device modes, proprietary boot environments, or bootable media containing command prompt or graphical operating systems, et cetera). Endpoints 340 can require installation or configuration for end user utility and, in some embodiments, prior to receiving increased network access. For example, an enterprise can order new computers for its members and require that a disk or file image be applied to those computers before they are distributed to the members. In a further example of the above, the image can include one or more security packages, such as network configuration information and keys, digital certificates, antivirus programs, firewalls, programs that restrict internet use, logging or monitoring software, and others that are related to access to remote resources 310.

In one or more embodiments, an installation or configuration of a device similar to the details supra can occur in varying degrees of standardization or customization. In at least one embodiment, a plurality of disk or file images can be maintained at least in part among remote resources 310. Image component 342 can, at least in part, select a particular image to apply to endpoints 340. In one or more embodiments, additional applications or features can be stored on remote resources 310. In at least one embodiment, image component 342, alone or in conjunction with other components or activity, can select (or de-select) or permit selection (or de-selection) of items to utilize before or after the image is applied. Examples of such items can include applications, utilities or other software, software drivers, firmware updates, library directories or files, other stored data, et cetera. In at least one embodiment, selection component 342 can identify the device, user, port, location, or other variable to determine what items to utilize during the imaging process.

In a limited example, a large corporation can image all of its computers with a standard software suite including an operating system configured for their networks, e-mail management software, and word processing software. This standard image is applied to all corporate computers. Their marketing department does not require a completely different image, but makes use of photo editing software and local copies of a library containing trade images and licensed clip-art. Accordingly, image component 342 can select or allow selection of photo editing software and the image library, collocated with remote resources 310 or elsewhere, and apply these changes to marketing computers in a uniform manner during the imaging process. In another limited example, the same corporation can upgrade a large number of computers containing sufficient common hardware for purposes of this example. When these computers are imaged via final connection 336, a firmware update can be applied to the computers containing sufficient common hardware, but no others. In this example, the firmware update can be applied either before or after other portions of the image, depending at least on whether the order in which items are applied has any impact on the system or its performance. In the above examples, detection of a new device on a port in the marketing department or upgraded computer bank, respectively, allows image component 342 (or another component of system 300) to automate selection of these items not contained in the standard image.

In another limited example, image component 342, alone or in combination with other components, can "strip down" an image by de-selecting features. For example, a "loaner" device may not require the entire package provided on normal devices assigned to an individual user. Accordingly, a minimal setup can be applied to such a device among endpoints 340. This can be accomplished by declining to apply aspects of an image if possible, or, in alternative embodiments, by automating a series of modifications, deletions and/or un-installs after a standard image is applied.

Figure 4:
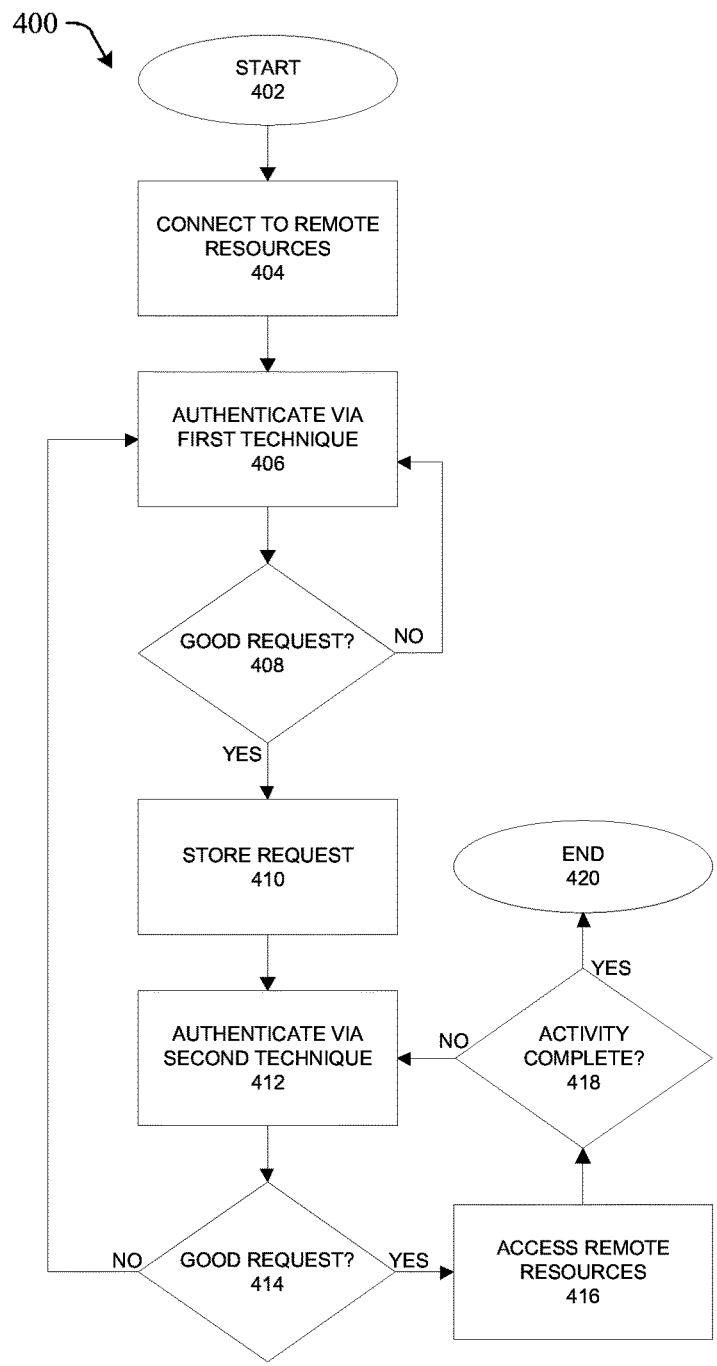
FIG. 4 illustrates a flow diagram of a methodology for accessing remote resources via a first authentication technique and second authentication technique.

Turning now to FIG. 4, illustrated is a flow diagram of a methodology for accessing remote resources via a first authentication technique and a second authentication technique. At 402, the methodology begins. At 404, an attempt to connect to remote resources is initiated. In embodiments, this connection attempt can be wired or wireless, using any protocols or technologies employed to permit electronic devices to send and receive transmissions.

At 406, the device is authenticated via a first technique. In an embodiment, a challenge can be presented requiring authentication information to be provided. At 408, the access request provided is evaluated, and a determination is made as to whether it is a good request that is recognized and permits positive authentication. In at least one embodiment, if this determination is returned in the negative, authentication restarts as the methodology recycles to 406. In at least an alternative embodiment, the methodology ends, and no further attempts are permitted. In at least one embodiment, a predetermined number of retries is permitted (e.g., 3 failed attempts) before no further attempts are permitted.

If the determination at 408 is returned in the affirmative, the good request can be stored at 410. The request can be stored, in some embodiments, as environmental variables. In such embodiments (or alternatives), the credential can additionally (or independently) be stored at 410 in a file and passed remotely.

At 412, authentication via a second technique is attempted. If this request is not determined affirmatively, the methodology can recycle to authentication via the first technique at 406. In some alternative embodiments, the methodology can terminate and allow no further authentication attempts, or begin counting a finite number of attempts, if the second technique at 412 is determined in the negative at 414.

If the determination at 414 is determined in the affirmative, access to remote resources is granted at 416. When a situation requiring re-authentication occurs, a determination is made at 418 as to whether activity requiring access to the remote resources is complete. If the determination regarding whether activity requiring access to the remote resources is complete at 418 is returned in the affirmative, the methodology proceeds to 420 and terminates.

If the determination at 418 is returned in the negative, the methodology can recycle to 412, where authentication via the second technique is repeated. In this way, multiple re-authentications can occur as needed until the activity is complete and the methodology ends appropriately at 420.

Figure 5:
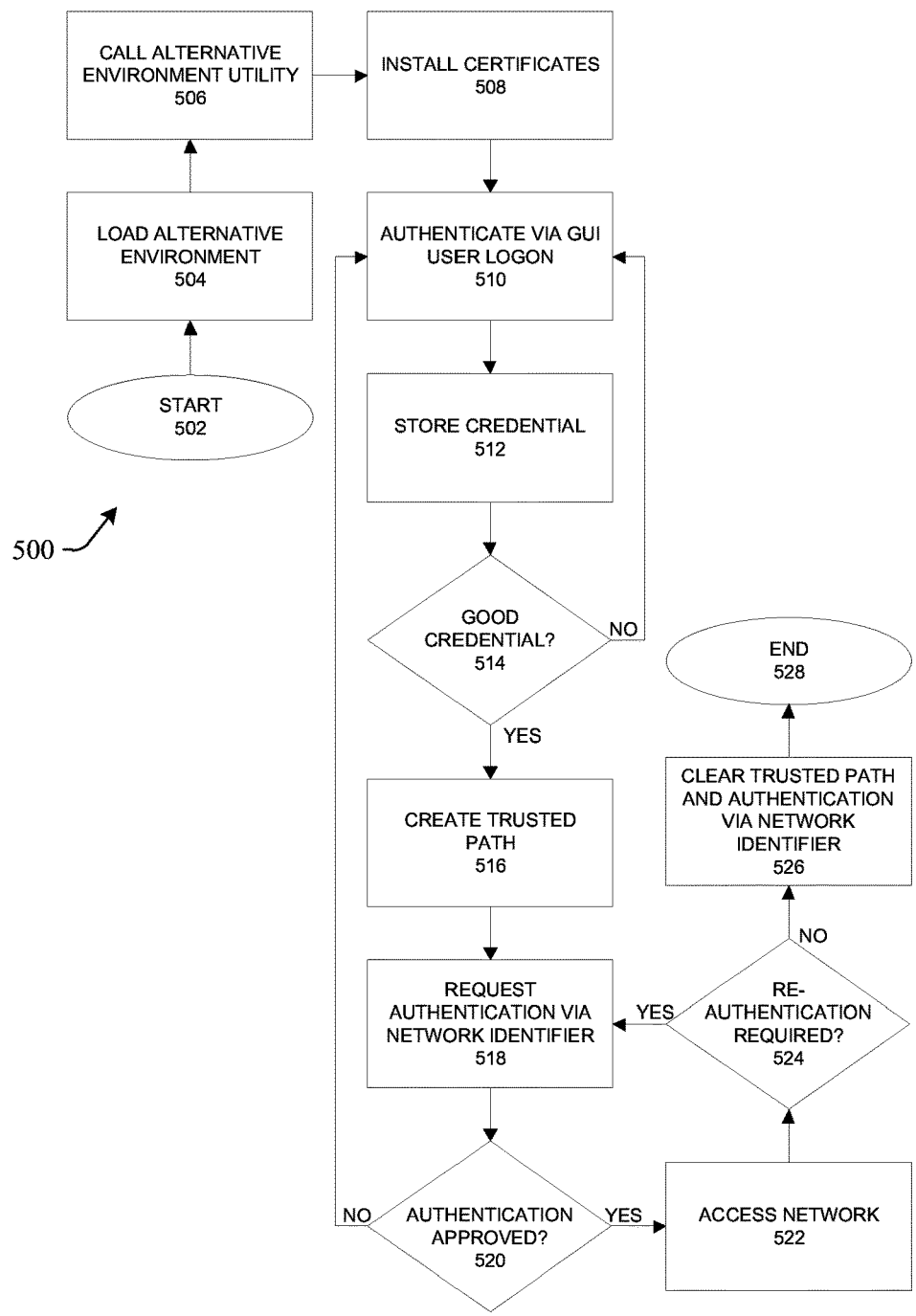
FIG. 5 illustrates a flow diagram of a methodology for accessing a network via a second authentication that is authorized via a first authentication.

Referring now to FIG. 5, illustrated is a flow diagram of a methodology for accessing a network via a second authentication that is authorized via a first authentication. The methodology begins at 502, and loads an alternate environment at 504. An alternate environment can include, for example, pre-install environments or modes not usually employed by end users, such as Windows PE, Mac OS X Netboot, diagnostic or configuration device modes, proprietary boot environments, or environments existing on local or remote bootable media.

At 506, an alternate environment utility is called. This utility can (but is not limited to) provide resources facilitating later steps of this methodology. For example, the alternate environment utility can provide connectivity function (described infra), manage or assist with the creation of a trusted path at 512, determine the scope and use of network access at 518, determine whether re-authentication is required at 520, and purge stored authentication information at 522 before or as this methodology terminates at 524. Further and alternate aspects of calling alternate environment utility at 506 will be apparent to those skilled in the art throughout.

Calling the alternate environment utility at 506 can occur locally, either from within a pre-configured package, as a standalone file (e.g., freestanding executable application or bundled install file), or from local (including removable)

media. Alternatively, calling the alternate environment utility can occur over a network or other communication means.

In at least one embodiment, the alternate environment utility can provide functionality not otherwise supported in the alternate environment. In some embodiments, the alternate environment utility can provide protocols and software support for network connectivity. In a non-limiting example, the alternate environment utility can provide support for 802.1x and associated authentication and network management technologies in Windows PE where the pre-install environment otherwise does not support this standard. Recital of this aspect related to the alternate environment utility in no way limits the other function, and no restriction, express or implied, is made regarding other aspects of this utility in view of these detailed embodiments and examples.

At 508, an authentication via a graphical user interface (GUI) user logon is initiated. In at least one non-limiting embodiment, an example of authenticating via a GUI user logon at 508 can include a prompt over a wired port on an 802.1x-enabled network. In at least one non-limiting embodiment, the prompt can be an EAP-type challenge used in conjunction with the 802.1x network, requiring username and password credentials to authenticate.

At 510, a determination is made as to whether the authentication at 508 provided a good credential (e.g., recognized username and correct associated password). If this determination returns in the negative, the methodology can recycle to 508 to attempt authentication again. In alternative embodiments, a failure to provide good credentials can terminate the methodology. Alternatives including limiting the number of retries (e.g., in a certain time span or total number), notifying an administrator, locking a device executing the methodology 500, and others are appreciated as falling under the possible scope of at least this aspect of the subject innovation.

If the determination at 510 is returned in the affirmative, a trusted path is created at 512. The creation of a trusted path at 512 is described in greater detail infra. For purposes of methodology 500, it is understood that, in some embodiments, creation of a trusted path at 512 relates to establishing conditions to effect secure network identifier-based authentication distinct from the GUI user logon-based authentication at 508. In such embodiments, actions including (but not limited to) checking network addresses or domains, installing certificates, storing credentials and network identifiers, passing credentials and network identifiers, second-/re-authenticating of a device, confirming successful authentication via the techniques at both 508 and 514, and others, can be completed.

A trusted path can include, but is not limited to, a bypass table permitting devices with a known network identifier to authenticate without entering credentials through a standard or default authentication. For example, the GUI user logon authentication at 508 can be a standard or default authentication technique. The trusted path can authorize authentication via a different authentication technique, such as a bypass table. By establishing a trusted path, bypass table techniques can be made secure. Procedures for making bypass tables secure can include confirming network identifiers and addresses, installing certificates, storing good credentials entered into the GUI logon at 508, creating an entry in a bypass table based in part on the stored good credentials, and removing or disallowing an entry in a bypass table upon certain conditions including (but not limited to) the expiration of a period of time and completion of a series of tasks.

In one or more non-limiting embodiments, creation of a trusted path at 512 can result in an entry in a MAB table associating a MAC address with the credentials provided to an EAP challenge to access an 802.1x enabled network. Express inclusion of the aforementioned embodiments should not be read to limit other possible embodiments employing alternate authentication at 514.

Once a trusted path is established at 512, the methodology proceeds to 514, where authentication is requested via a network identifier. If a trusted path has been properly created, authentication can be approved at 516. If no trusted path exists or the authentication is not approved at 516, the methodology can, in some embodiments, recycle to the GUI-based user logon authentication method at 508. As described elsewhere herein, further and other aspects related to actions subsequent to a failed authentication will be appreciated by those skilled in the art.

Approval of network access at 516 to access the network at 518 can allow, for example, access to and application of a disk or file image and/or other installation and configuration items. In embodiments where the alternate operating environment loaded at 504 is a preinstall environment, network access at 518 can facilitate, for example, imaging of a device to set the device to a standard user environment. This can include, but is not limited to, installation or updating of an operating system, drivers, firmware, settings, permissions, security features, applications, utilities, other standalone software or suites, and other remotely-installable or controllable functions used with devices configured to communicate with other devices.

As described, once methodology 500 beings utilizing network access at 518, the installations, updates, and modifications can require that the device restart or change its state in a way that necessitates re-authentication to continue these tasks. The network can be re-accessed should these or other tasks require disconnection, and the tasks can proceed automatically.

When the authentication state changes (e.g., by way of disconnection from the network or changing users), it can be necessary for the tasks to proceed subsequent to re-authentication as determined at 520. For example, re-authentication can be necessary as a result of restarting or committing changes to a device. At 520, a determination as to whether re-authentication is required can be returned in the affirmative, and the methodology will recycle to 514, where another request for authentication via a network identifier is completed. After approving the authentication request at 516, network access can resume at 518, and tasks can proceed over the network until it is necessary to determine whether another re-authentication is required.

In one or more embodiments, re-authentication at 514 is accomplished using an exception in a MAB table. When the device reestablishes a connection, the device's MAC address and stored credentials can permit access to the network at 518 without user input or repeating the challenge of the GUI user logon at 508. This can repeat as many times as necessary, within any constraints, to complete, for example, imaging of the device. Constraints can include, but are not limited to, completion of tasks (e.g., imaging), expiration of a time period (e.g., 24 hours after creation of the exception), a number of failed authentication and re-authentication attempts (total or within a given window of time), and so forth.

If no further re-authentications are required at 520, the methodology 500 proceeds to 522 where the trusted path and other authentication information related to network identifier authentication are cleared. Re-authentication via network identifier will no longer be possible as at 514, and future authentication will return to the standard or default. In some embodiments, the standard or default authentication can be the GUI user logon authentication at 508. In some embodiments, the alternate environment utility will be deleted or permission to access the same will be revoked when the trusted path and authentication via network identifier are cleared.

When network access at 518 is complete and no further re-authentications are required at 520, the trusted path is cleared at 522, and the methodology 500 proceeds to its end at 524.

Figure 6:
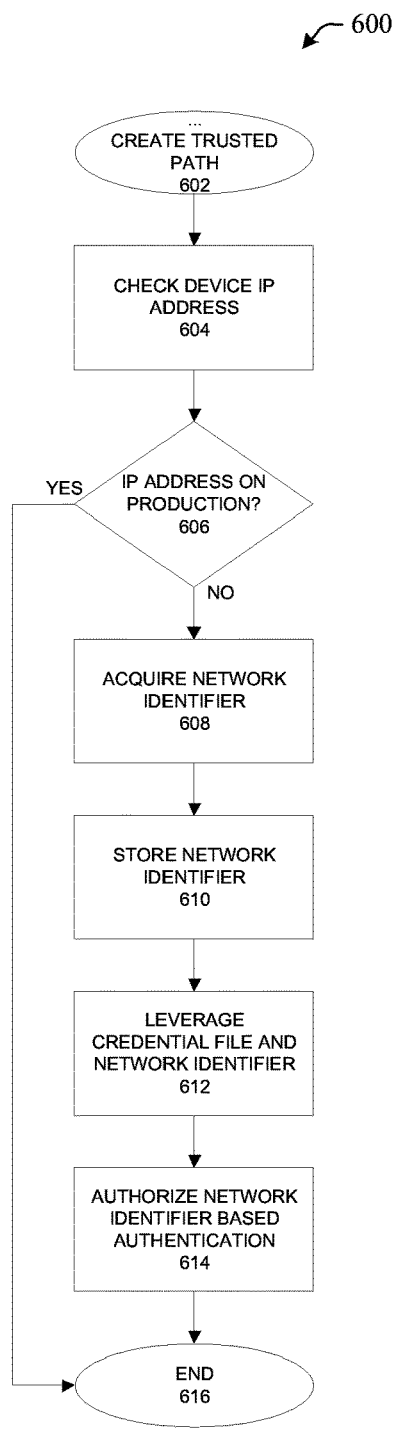
FIG. 6 illustrates a flow diagram of a methodology for creating a trusted path to be used with two distinct authentication techniques.

With reference now to FIG. 6, illustrated is a flow diagram of a methodology for creating a trusted path to be used with two distinct authentication techniques. This is just one possible methodology for creating a trusted path in support of aspects described herein, and it is appreciated that alternate techniques can be employed without prejudice to the systems and methods set forth. It is understood that creation of a trusted path, in some embodiments, can only require one step, rearrange the order of steps, or combine some but not all steps in ways other than pictured in methodology 600.

At 602, the methodology starts after initiating a task to create a trusted path. At 604, a device IP address (or other identifiers or characteristics) are checked to confirm the device is properly connected to the appropriate network to proceed with the activities associated with creating and using a trusted path. In one or more embodiments, an IP address or other aspect can be checked to ensure the device is on a production network or in a production domain before proceeding.

At 606, a determination is made as to whether the device is in the proper domain. If this determination returns in the negative, methodology 600 proceeds to its end at 618, and no trusted path is created. In the event no trusted path is created, aspects similar to those relating to failed authentications described elsewhere herein can be employed. For example, methodology 600 can employ retries with or without extrinsic re-authentications to create a trusted path where a previous attempt to create a trusted path failed. In one or more complementary or alternative embodiments, an error message or other notification can appear to a local user, remote user, administrator or other interested party indicating the cause of the failure (e.g., improper IP address for domain).

If the domain determination at 606 returns in the affirmative, certificates can be installed at 608. Certificates installed can allow a device obtaining a trusted path to connect without delay or challenge to other network entities (e.g., servers), even if these entities were previously unknown to the device. In some embodiments, certificates can be required for two entities to transmit or receive to and from one another at all.

After certificate installation at 608, a network identifier of a device seeking to establish the trusted path is acquired at 610. In one non-limiting example, the network identifier can be a MAC address. Other possible identifiers are discussed herein and will be apparent to those skilled in the art.

Methodology 600 then proceeds to generate a credential file at 612. The credential file can include, but is not limited to, credential information (e.g., user name and password associated with the user name) and the network identifier (e.g., MAC address). Once again, other possible information and arrangements are apparent to those of normal skill in the art in light of the disclosures herein. The credentials can be stored as, for example, environmental variables prior to initiation of this methodology at 602. The credentials can be, but are not limited to, credentials for passing an EAP challenge over a wired 802.1x network. In a non-limiting embodiment, the credential file can be an extensible markup language (XML) file. In such embodiments, the XML file can additionally contain information such as a domain and MAC address.

At 614, the credential file is stored and forwarded for use in conjunction with a network identifier-based authentication. In some embodiments, the credential file can be forwarded to a web service. In one or more embodiments, the credential file can be forwarded to the web service securely or over a secure channel. In some embodiments, the credential file can be encrypted or secured prior to forwarding.

At 616, an authorization is made permitting network identifier-based authentication. This completes the trusted path, and allows a device that has established a trusted path to rely solely on its network identifier and stored information to automate the re-authentication process. In a non-limiting example, the trusted path permits employment of an exception within a MAB table, where the stored credentials are included in the MAB table to allow a device to re-authenticate as needed so long as its MAC address remains static during associated processes.

At 618, methodology 600 ends. If 618 is reached through authorization at 616, a trusted path has been created for at least one device. If a device was not in the proper domain or failures occurred elsewhere, termination of methodology 600 at 618 ends without the creation of a trusted path, but can be renewed for further attempts in some embodiments.

Figure 7:
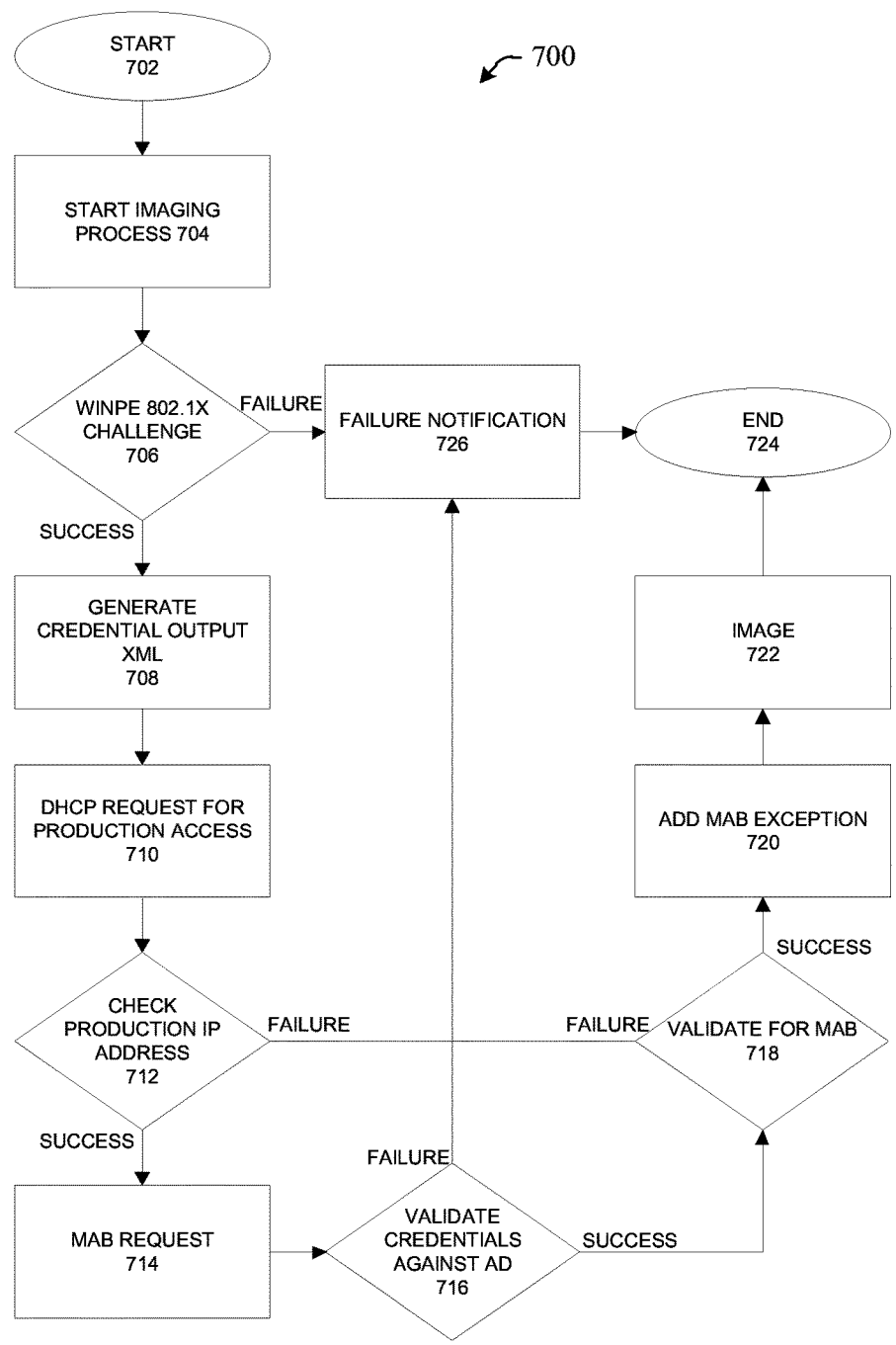
FIG. 7 illustrates a flow diagram of a methodology for imaging a device in accordance with aspects of the subject innovation set forth herein.

With respect to FIG. 7, illustrated is a flow diagram of a methodology for imaging a client in accordance with aspects of the subject innovation set forth herein. At 702, the methodology begins and proceeds to 704 where the imaging process starts. At this time, a client being imaged can call a utility designed to provide resources for and manage the progress of the imaging process in the given operating environment, as well as provide failure notifications in the event of errors.

At 706, a client is presented with a logon challenge to enter a Windows Pre-Install Environment (WinPE) on an 802.1x enabled network. In one or more embodiments, PEAP-MSCHAPv2 is leveraged to provide this capability. In at least one embodiment, the credentials provided at the challenge are stored as environmental variables. In such embodiments, storing of the credentials can occur upon or during entry, or after they are successfully recognized. If the client fails to provide recognized credentials, a failure notification is presented at 728 and methodology 700 terminates at 726. As described herein, those skilled in the art will appreciate additional or alternative steps that can be taken in view of one or multiple failed challenge attempts. Likewise, it is understood that failure notifications can be displayed, logged or presented locally or remotely, to the client, an administrator, or other entities.

Upon successful provisioning of recognized credentials at 706, methodology 700 proceeds to generate a credential output XML file for use in conjunction with the MAB request at 714. In at least one embodiment, the client is pinged prior to generation of the credential output XML file. Pinging the client can be used, at least in part and in some embodiments, to identify the client's MAC address or other characteristics (e.g., domain or IP address). In at least one embodiment, the client's MAC address is included in the credential output XML file. A domain can also be included in the credential output XML file. In at least one embodiment, a timestamp is generated (or associated with the client based on native system capabilities) to provide for expiration of methodology 700 and elimination or disallowance of stored credentials and MAB exceptions after a predetermined period of time passes. In some embodiments, the timestamp is an innate function of an operating system or hardware architecture (e.g. variable associated with all files, such as "Created" and "Modified" time properties in known file systems), obviating the need to expressly and redundantly time stamp credentials or other files or variables during methodology 700. In one or more embodiments, there can be more than one predetermined period of time. One predetermined period of time can be associated with one or more aspects of methodology 700 (e.g., complete 718 no later than 30 minutes after 706). Another predetermined period of time can be associated with the entire methodology (e.g., complete 724 and proceed to 726 no later than 24 hours after 706). In some embodiments, different periods of time or other conditions can be associated with different devices or groups of devices.

At 710, a Dynamic Host Configuration Protocol (DHCP) request for access to a production domain is processed. At 712, a check is performed to confirm that the client's IP address is in the production domain. It is appreciated that, while "production domain" is discussed herein, a variety of network identifiers or addresses relating to various domains, networks and subnetworks, LANs/VLANs, network numbers, host numbers, et cetera, can be checked in the same fashion as an additional validation step to confirm the client is authorized. In the earlier embodiment, if the client IP address is not within the production domain, a failure notification is processed at 728 and methodology 700 terminates at 726. If the IP address is appropriate, methodology 700 advances to 714. Other possibilities following IP address mismatch are understood in view of the disclosures herein.

At 714, a request is made to a server providing MAB functionality. In at least one embodiment, a MAB exception script is executed. In an embodiment, a RADIUS server can maintain an exception list effecting MAB function. In at least one embodiment, an alternative server providing similar AAA management is employed to accomplish administration of MAB (or similar) exceptions. At 716, the client's credentials are validated against Active Directory. In at least one embodiment, a service other than Active Directory facilitates validation of the client credentials. In at least one embodiment, the credentials must be passed from the client prior to 716, as embodiments in which the client operates in WinPE will not permit the client to belong to Active Directory. In at least one embodiment, which can be distinct from or employed in conjunction with the former, credentials and other client information (e.g., MAC address) can be passed via a web service. In at least one embodiment, the web service employs a Secure Sockets Layer (SSL) session.

If the credentials do not match, a failure notification is processed at 728, and methodology 700 terminates at 726. In alternative embodiments, methodology 700 may recycle to its start at 702 or an different point to attempt to reconcile the mismatch. Other possible courses of action following credential mismatch are understood in view of the disclosures herein.

If the credentials are successfully validated, another validation step confirms the client's MAC address matches that associated with the credentials at 718. If there is a mismatch in the MAC address, a failure notification is processed at 726, and methodology 700 ends at 724. Other possibilities following MAC mismatch are understood in view of the disclosures herein. In at least one embodiment, the MAC address must have been associated with the credentials within a timeframe (e.g., 230B of FIG. 2). For example, if the original challenge at 706 has not occurred in the past 30 minutes, methodology 700 can proceed to failure notification at 726 and end at 724. In at least one embodiment, a check is performed on the MAB exception list to confirm at least one of the clients, its MAC address, or its credentials are not already in the exception list. If a client is already on the exception list, in some embodiments, the existing entry on the exception list will be used with that client. In other embodiments, the list or a given entry thereon can be updated, removed and re-added, and so forth to deconflict duplicate entries and different constraints (e.g., techniques can be employed to allow to entries but use only one expiration time in relation to both). In at least one embodiment, a security warning can be triggered to the client or to an administrator when a duplicate entry is attempted.

If the MAC address is successfully validated, a MAB exception is added to the MAB exception list at 720. At 722, a DHCP reset is completed, at least in part to release and renew the client IP configuration. The exception permits the client to bypass the WinPE 802.1x challenge while the MAB exception exists. This allows imaging of the client at 724, even if the client must restart or logoff during the process. In this way, the client can be imaged at 724 without requiring the client to provide credentials again during imaging, making subsequent action "touchless" until imaging is complete. At 726, after imaging is complete, methodology 700 ends. Before completely ending at 726, a cleanup can be performed, which eliminates or revokes permission to use the MAB exception associated with the client as well as any stored credentials. This cleanup can also be based, independently or in conjunction with the imaging process, a timer. For example, 24 hours after the original 802.1x challenge, any MAB exceptions or stored credentials can automatically be removed for security, requiring that methodology 700 repeat in whole in order to image a client in accordance with these aspects of the subject innovation.

Figure 8:
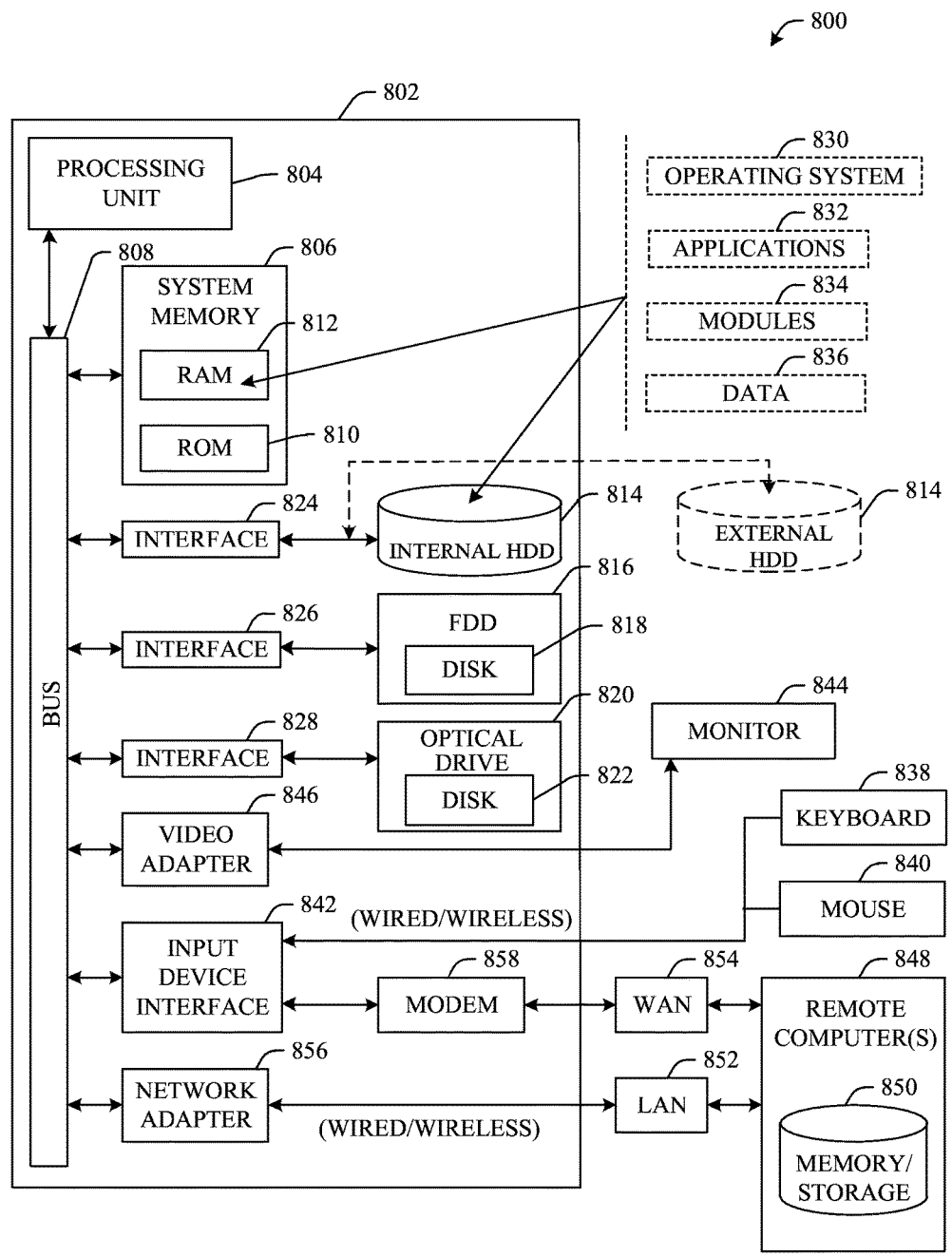
FIG. 8 illustrates a brief general description of a suitable computing environment wherein the various aspects of the subject innovation can be implemented.
Figure 9:
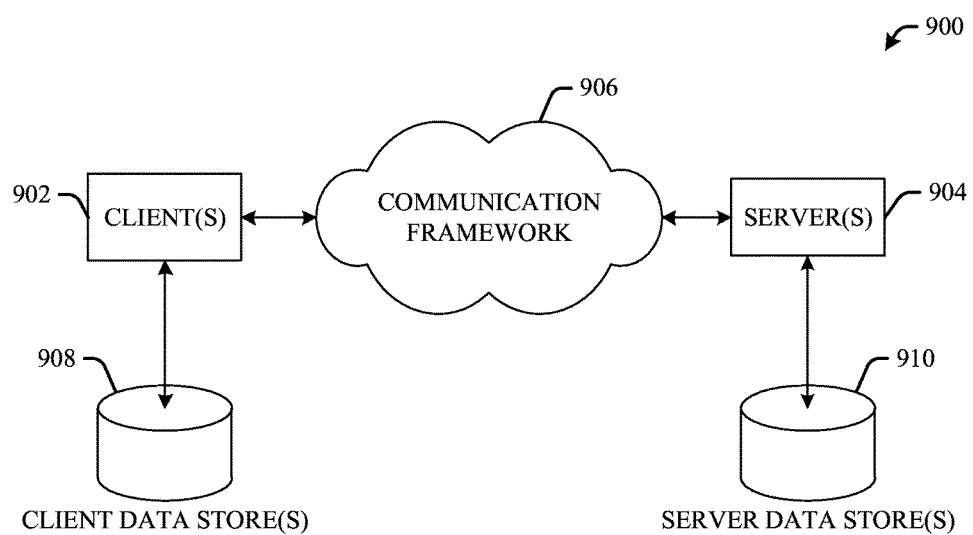
FIG. 9 illustrates a schematic diagram of a client—server-computing environment wherein the various aspects of the subject innovation can be implemented.

FIG. 8 illustrates a brief general description of a suitable computing environment wherein the various aspects of the subject innovation can be implemented, and FIG. 9 illustrates a schematic diagram of a client—server-computing environment wherein the various aspects of the subject innovation can be implemented.

With reference to FIG. 8, the exemplary environment 800 for implementing various aspects of the innovation includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA). Alternatively or in addition, an external hard disk drive 815 may also be configured for external use in a suitable chassis (not shown), a magnetic disk drive, depicted as a floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drives 814, 815 magnetic disk drive 816 and optical disk drive 820 can be connected to the system bus 808 by a hard disk drive interface 824, a magnetic disk drive interface 826 and an optical drive interface 828, respectively. The interface 824 for external drive implementations can include Universal Serial Bus (USB), IEEE 1394 interface technologies, and/or other external drive connection technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and system memory 806, including an operating system 830, one or more application programs 832, other program modules 834 and program data 836. All or portions of the operating system, applications, modules, and/or data can also be cached in the RAM 812. It is appreciated that the innovation can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, et cetera A monitor 844 or other type of display device is also connected to the system bus 808 via an interface, such as a video adapter 846. In addition to the monitor 844, a computer typically includes other peripheral output devices (not shown), such as speakers, printers, et cetera The computer 802 may operate in a networked environment using logical connections via wired and/or wireless communications to one or more remote computers, depicted as remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842 as depicted. It should be appreciated that the modem 858 can be connected via a USB connection, a PCMCIA connection, or another connection protocol. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, et cetera) to provide secure, reliable, fast wireless connectivity. A Wi-Fi network can be used to connect computers to each other, to the Internet, and to wired networks (which use IEEE 802.3 or Ethernet).

FIG. 9 is a schematic block diagram of a sample-computing environment 900 that can be employed for practicing aspects of the aforementioned methodology. The system 900 includes one or more client(s) 902. The client(s) 902 can be hardware and/or software (e.g., threads, processes, computing devices). The system 900 also includes one or more server(s) 904. The server(s) 904 can also be hardware and/or software (e.g., threads, processes, computing devices). The servers 904 can house threads to perform transformations by employing the components described herein, for example. One possible communication between a client 902 and a server 904 may be in the form of a data packet adapted to be transmitted between two or more computer processes. The system 900 includes a communication framework 906 that can be employed to facilitate communications between the client(s) 902 and the server(s) 904. The client(s) 902 are operatively connected to one or more client data store(s) 908 that can be employed to store information local to the client(s) 902. Similarly, the server(s) 904 are operatively connected to one or more server data store(s) 910 that can be employed to store information local to the servers 904.

What has been described above includes examples of the various versions. It is, of course, not possible to describe every conceivable combination of components or methodologies for purposes of describing the various versions, but one of ordinary skill in the art may recognize that many further combinations and permutations are possible. Accordingly, the subject specification intended to embrace all such alterations, modifications, and variations that fall within the spirit and scope of the appended claims.

It is appreciated that, while aspects of the subject innovation described herein focus in wholly-automated systems, this should not be read to exclude partially-automated or manual aspects from the scope of the subject innovation. Practicing portions or all of some embodiments manually does not violate the spirit of the subject innovation.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers, and so forth). Such components, inter alia, can automate certain mechanisms or processes performed thereby to make portions of the systems and methods more adaptive as well as efficient and intelligent. By way of example and not limitation, the aggregation of password rules can infer or predict support or the degree of parallelism provided by a machine based on previous interactions with the same or like machines under similar conditions. As another example, touch scoring can adapt to hacker patterns to adjust scoring to thwart successful approaches.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method, comprising:
    authenticating, by a hardware processor, a device to a network via a first authentication technique during an initial access request;
    after successful authentication with the first authentication technique, storing, by the hardware processor, information related to the first authentication technique;
    creating, by the hardware processor, a record of the device related to a second authentication technique, wherein the record includes at least the information related to the first authentication technique;
    after the device changes state due to an activity that results in a re-authentication with the network, authenticating, by the hardware processor, the device to the network via the second authentication technique during a subsequent access request without re-authenticating with the first authentication technique, the second authentication technique does not rely on manual entry at the device; and
        wherein the information related to the first and to the second authentication techniques are annotated and kept in the record of the device until a non-expiration-timing event prompts, by the hardware processor, removal, by the hardware processor, the information related to the first authentication technique and the record of the device related to the second authentication technique.

2. The method of claim 1, further comprises creating, by the hardware processor, a trusted path between the device and the second authentication technique, the trusted path comprises a bypass table in effect for until a non-expiration-timing event after the successful authentication with the first authentication technique.

3. The method of claim 1, wherein the authenticating the device to the network via the second authentication technique comprises authenticating the device at least in part by recognizing a network identifier associated with the device based on the record.

4. The method of claim 1, further comprising:
changing, by the hardware processor, an authentication status of the device; and
authenticating, by the hardware processor, the device via the second authentication technique.

5. The method of claim 1, further comprising imaging, by the hardware processor, the device.

6. The method of claim 5, further comprising:
removing, by the hardware processor, the information related to the first authentication technique; and
removing, by the hardware processor, the record of the device related to the second authentication technique.

7. The method of claim 1, further comprising providing, by the hardware processor, compatibility between the device and the network.

8. The method of claim 1, further comprising modifying, by the hardware processor, an image to be applied to the device based on at least one of the information related to the first authentication technique and a network identifier associated with the device.

9. A system for imaging a device, comprising:
a hardware processor that executes the following executable components stored in a memory:
a first access control implementing a first authentication technique that authenticates the device to a network during a first authentication attempt;
a database storing information related to the first authentication technique and creating a record of the device related to a second authentication technique, wherein the record includes at least the information related to the first authentication technique;
a second access control implementing the second authentication technique after a state of the device changes based on an activity that results in a re-authentication with the network, the second authentication technique is based upon successful authentication of the device to the network by the first access control during the first authentication attempt and authenticates the device to the network on a second authentication attempt without the use of the first access control and without input from the device; and
wherein the database storing information related to the first and to the second authentication techniques annotates the record of the device until a non-expiration-timing event prompts, by the hardware processor, removal, by the hardware processor, the information related to the first authentication technique and the record of the device related to the second authentication technique.

10. The system of claim 9, wherein the second access control creates a trusted path between the device and the second authentication technique, the trusted path comprises a bypass table effective for until a non-expiration-timing event after the successful authentication during the first authentication attempt.

11. The system of claim 9, wherein the record permits the second authentication technique to authenticate the device at least in part by recognizing a network identifier associated with the device.

12. The system of claim 9, wherein the first access control changes an authentication status of the device, and the second access control authenticates the device via the second authentication technique.

13. The system of claim 9, wherein the executable components further comprise an imaging processor that images the device.

14. The system of claim 13, wherein the database removes the information related to the first authentication technique and the record of the device related to the second authentication technique.

15. The system of claim 9, wherein the executable components further comprise:
a compatibility processor providing compatibility between the device and the network.

16. The system of claim 9, wherein the executable components further comprise:
the hardware processor modifying an image to be applied to the device based on at least one of the information related to the first authentication technique and a network identifier associated with the device.

* * * * *